US012764404B2

(12) United States Patent
Lim et al.

(10) Patent No.: US 12,764,404 B2
(45) Date of Patent: Oct. 13, 2026

(54) CAMERA MODULE

(71) Applicant: SAMSUNG ELECTRO-MECHANICS CO., LTD., Suwon-si (KR)

(72) Inventors: Soo Cheol Lim, Suwon-si (KR); Nam Ki Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/782,616

(22) Filed: Jul. 24, 2024

(65) Prior Publication Data

US 2024/0380964 A1 Nov. 14, 2024

Related U.S. Application Data

(63) Continuation of application No. 18/305,673, filed on Apr. 24, 2023, now Pat. No. 12,075,147, which is a continuation of application No. 17/069,304, filed on Oct. 13, 2020, now Pat. No. 11,665,416.

(30) Foreign Application Priority Data

Mar. 13, 2020 (KR) ........................ 10-2020-0031170

(51) Int. Cl.
*H04N 23/55* (2023.01)
*H04N 23/54* (2023.01)

(52) U.S. Cl.
CPC ............. *H04N 23/55* (2023.01); *H04N 23/54* (2023.01)

(58) Field of Classification Search
CPC ........ H04N 23/54; H04N 23/55; H04N 23/57; H04N 25/617
See application file for complete search history.

(56) References Cited

U.S. PATENT DOCUMENTS

| | | | | |
|---|---|---|---|---|
| 8,817,375 | B2 | 8/2014 | Motoike et al. | |
| 10,827,104 | B2 | 11/2020 | Huang et al. | |
| 11,048,147 | B2 * | 6/2021 | Sharma | G03B 3/04 |
| 11,360,321 | B2 * | 6/2022 | Park | G02B 27/64 |

(Continued)

FOREIGN PATENT DOCUMENTS

| | | |
|---|---|---|
| CN | 102292673 A | 12/2011 |
| CN | 105717725 A | 6/2016 |

(Continued)

OTHER PUBLICATIONS

Korean Office Action issued on Jan. 19, 2021 in the corresponding Korean Patent Application No. 10-2020-0031170. (8 pages in English) (6 pages in Korean).

(Continued)

*Primary Examiner* — Amy R Hsu
(74) *Attorney, Agent, or Firm* — NSIP Law

(57) ABSTRACT

A camera module includes a driving assembly configured to drive a lens module in a direction intersecting an optical axis. The driving assembly includes: a driving magnet member; auxiliary magnet members arranged on opposing sides of the driving magnet member and arranged to have polarities different from a polarity of the driving magnet member in a first direction; and a driving coil including portions extending along boundaries between the driving magnet member and the auxiliary magnet members.

15 Claims, 12 Drawing Sheets

(56) References Cited

U.S. PATENT DOCUMENTS

| | | | | |
|---|---|---|---|---|
| 2005/0180275 | A1 | 8/2005 | Shiraki et al. | |
| 2009/0252488 | A1 | 10/2009 | Eromaki et al. | |
| 2011/0279899 | A1* | 11/2011 | Motoike | H04N 23/687 359/557 |
| 2012/0154614 | A1* | 6/2012 | Moriya | H04N 23/54 348/208.5 |
| 2012/0229926 | A1 | 9/2012 | Wade et al. | |
| 2013/0016427 | A1 | 1/2013 | Sugawara | |
| 2016/0154249 | A1 | 6/2016 | Yeo | |
| 2016/0178924 | A1 | 6/2016 | Lim et al. | |
| 2016/0241787 | A1* | 8/2016 | Sekimoto | G02B 7/09 |
| 2018/0164661 | A1 | 6/2018 | Sekimoto et al. | |
| 2019/0297235 | A1* | 9/2019 | Huang | H04N 23/55 |
| 2019/0394399 | A1 | 12/2019 | Abe et al. | |
| 2021/0297596 | A1* | 9/2021 | Enta | H04N 23/67 |

FOREIGN PATENT DOCUMENTS

| | | | |
|---|---|---|---|
| CN | 107889528 | A | 4/2018 |
| CN | 110312059 | A | 10/2019 |
| JP | 2006-294157 | A | 10/2006 |
| JP | 2013-24938 | A | 2/2013 |
| KR | 10-2005-0082413 | A | 8/2005 |
| KR | 10-2012-0097122 | A | 9/2012 |
| KR | 10-1591685 | B1 | 2/2016 |
| KR | 10-2019-0103862 | A | 9/2019 |
| WO | WO 2010/084965 | A1 | 7/2010 |

OTHER PUBLICATIONS

Chinese Office Action issued on Nov. 15, 2022, in counterpart Chinese Patent Application No. 202011539566.3 (8 pages in English, 8 pages in Chinese).

Chinese Office Action issued on Dec. 26, 2025 in corresponding Chinese Patent Application No. 202310820486.2 (3 pages in English and 6 pages in Chinese).

Chinese Office Action issued on Jul. 31, 2026, in counterpart Chinese Patent Application No. 202310819326.6 (7 Pages in English, 9 Pages in Chinese).

* cited by examiner

CAMERA MODULE

CROSS-REFERENCE TO RELATED APPLICATIONS

This application is a continuation of U.S. application Ser. No. 18/305,673 filed on Apr. 24, 2023, which is a continuation of U.S. application Ser. No. 17/069,304 filed on Oct. 13, 2020, now U.S. Pat. No. 11,665,416 issued on May 30, 2023, which claims the benefit under 35 U.S.C. § 119 (a) of Korean Patent Application No. 10-2020-0031170 filed on Mar. 13, 2020 in the Korean Intellectual Property Office, the entire disclosures of which are incorporated herein by reference for all purposes.

BACKGROUND

1. Field

The following description relates to a camera module. For example, the following description relates to a camera module configured to minimize magnetic field interference between internal components of the camera module.

2. Description of Related Art

A camera module may include a lens module and a driving assembly configured to drive the lens module. For example, the camera module may include a lens module including a plurality of lenses, and one or more driving assemblies configured to drive the lens module in a direction of an optical axis and in a direction intersecting the optical axis. The one or more driving assemblies may include a plurality of magnets and a plurality of coils configured to generate different levels of driving force. For example, a magnet and a coil of a first driving assembly may be configured to move the lens module in the direction of the optical axis, and a magnet and a coil of a second driving assembly may be configured to move the lens module in the direction intersecting the optical axis. However, since a relatively small camera module may have a relatively narrow space in which the first driving assembly and the second driving assembly are disposed, interference between the magnet and the coil of the first driving assembly and the magnet and the coil of the second driving assembly may occur.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a driving assembly configured to drive a lens module in a direction intersecting an optical axis. The driving assembly includes: a driving magnet member; auxiliary magnet members arranged on opposing sides of the driving magnet member and arranged to have polarities different from a polarity of the driving magnet member in a first direction; and a driving coil including portions extending along boundaries between the driving magnet member and the auxiliary magnet members.

First and second polarities of the driving magnet member may be formed in the direction intersecting the first direction.

A length of each of the auxiliary magnet members in the first direction may be less than a length of the driving magnet member in the first direction.

A length of the driving coil in the first direction may be less than a total sum of a length of the driving magnet member and a length of each of the auxiliary magnet members arranged in the first direction.

A height of the driving coil may be greater than a height of the driving member.

The driving magnet member may include a first driving magnet member and a second driving magnet member, arranged in the first direction.

A length of the first driving magnet member in the first direction and a length of the second driving magnet member in the first direction may be respectively greater than a length of each of the auxiliary magnet members in the first direction.

The driving coil may include: a first driving coil formed along an edge of the first driving magnet member; and a second driving coil disposed adjacent to the first driving coil and formed along an edge of the second driving magnet member.

In another general aspect, a camera module includes a driving assembly configured to drive a lens module in a direction intersecting an optical axis. The driving assembly includes: a first driving magnet member; a second driving magnet member disposed side-by-side with the first driving magnet member; a first driving coil disposed to oppose the first driving magnet member, the first driving coil being formed along a boundary between the first driving magnet member and the second driving magnet member, and along an edge of the first driving magnet member; and a second driving coil disposed to oppose the second driving magnet member, the second driving coil being formed along the boundary between the first driving magnet member and the second driving magnet member, and along an edge of the second driving magnet member.

The first driving coil and the second driving coil may be arranged at an interval, based on the boundary between the first driving magnet and the second driving magnet.

A length of the first driving coil in a first direction may be greater than a length of the first driving magnet member in the first direction.

The first driving magnet member and the second driving magnet member may have different polarities in the first direction.

The first driving coil and the second driving coil may be configured to allow a current to flow in a same direction at the boundary between the first driving magnet member and the second driving magnet member.

In another general aspect, a camera module includes a driving assembly configured to drive a lens module in a direction intersecting an optical axis. The driving assembly includes: a driving magnet in which a first polarity boundary line and a second polarity boundary line are formed at an interval in the direction intersecting the optical axis; and a driving coil including portions extending along the first polarity boundary line and the second polarity boundary line.

A length of the driving magnet may be greater than a length of the driving coil.

A distance between the first polarity boundary line and the second polarity boundary line may be greater than a distance between the first polarity boundary line and an end portion of the driving magnet.

A height of the driving coil may be greater than a height of the driving magnet.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
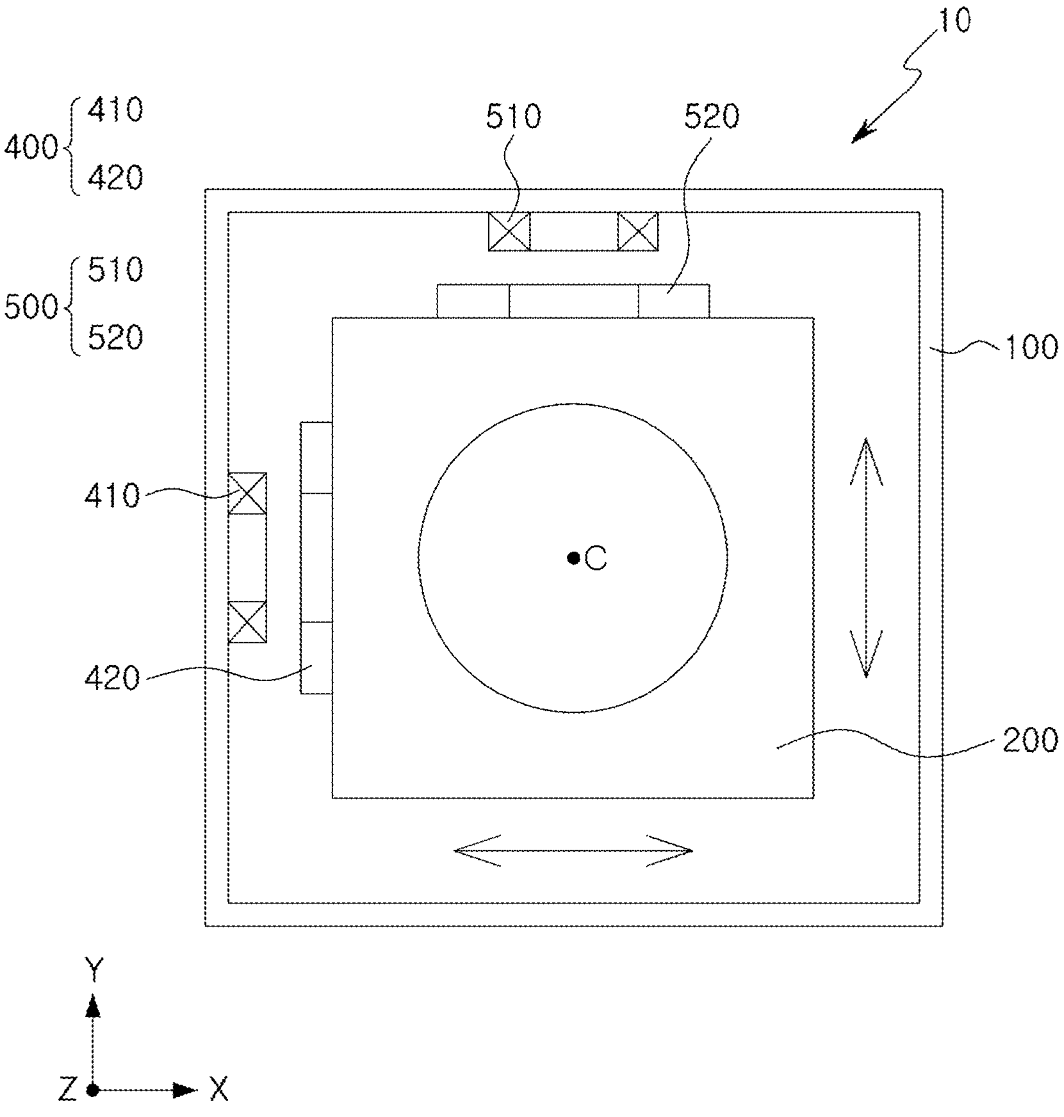
FIG. 1 is a plan view illustrating a schematic configuration of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

Figure 2:
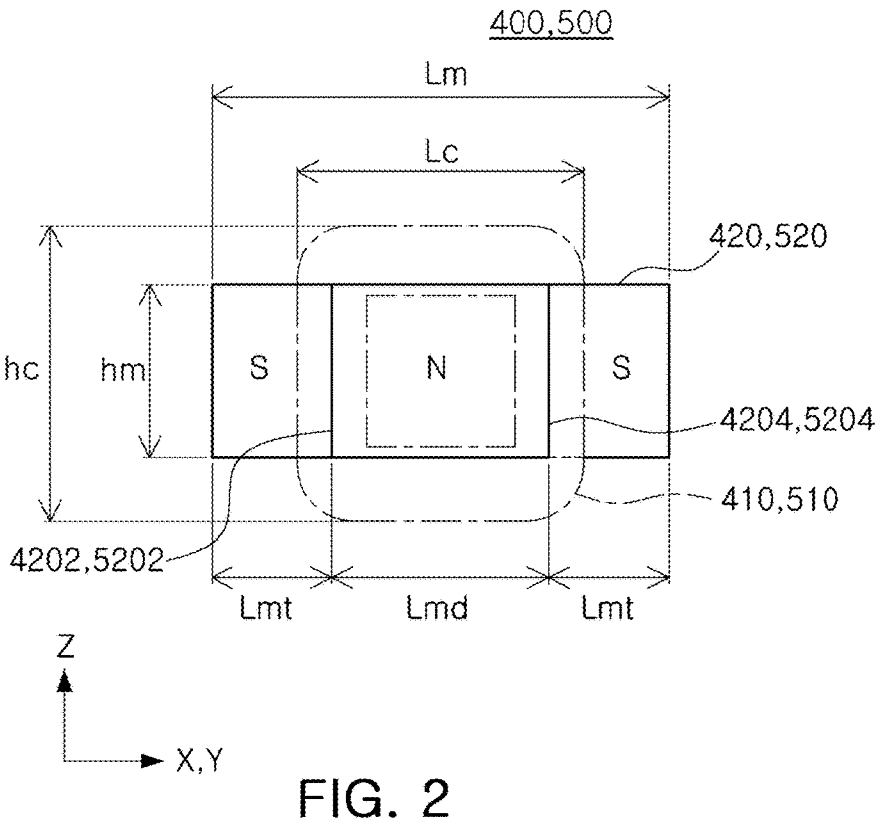
FIG. 2 is a front view of a driving assembly illustrated in FIG. 1.

FIGS. 1 and 2 illustrate a camera module 10, according to an embodiment.

The camera module 10 may be mounted in a portable electronic product. For example, the camera module 10 may be mounted on a mobile phone, a laptop computer, or the like. However, applications of the camera module 10 are not limited to the above-mentioned electronic products. For example, the camera module 10 may be mounted in an automated teller machine (ATM), a television for interactive broadcasting, or the like.

Referring to FIG. 1, the camera module 10 may include a structure for accommodating various component elements necessary for a function of the camera module 10. For example, the camera module 10 may include a housing 100.

The camera module 10 may include one or more components for imaging light reflected from a subject on an image sensor. For example, the camera module 10 may include a lens module 200. The lens module 200 may include a lens having refractive power. For example, the lens module 200 may include four (4) or more lenses. The number of lenses included in the lens module 200 is not limited to four (4). For example, the lens module 200 may include three (3) or less lenses, or may include five (5) or more lenses.

The camera module 10 may be configured to have an optical image stabilization (OIS) function. For example, the camera module 10 may include driving assemblies 400 and 500 for driving the lens module 200 in respective directions intersecting an optical axis C.

The driving assemblies 400 and 500 may include driving coils 410 and 510, respectively, and driving magnets 420 and 520, respectively. The driving coils 410 and 510 may be respectively disposed in the housing 100. For example, the driving coil 410 and the driving coil 510 may be arranged on different side surfaces of the housing 100. The driving magnets 420 and 520 may be respectively disposed on the lens module 200. For example, the driving magnet 420 and the driving magnet 520 may be arranged on different side surfaces of the lens module 200. The driving coils 410 and 510 and the driving magnets 420 and 520 may be arranged to oppose each other, respectively. For example, the driving coil 410 may be disposed to oppose the driving magnet 420, and the driving coil 510 may be disposed to oppose the driving magnet 520. The driving assembly 400 and the driving assembly 500 may be configured to provide force in different directions. For example, the driving assembly 400, (e.g., the driving coil 410 and the driving magnet 420), may generate driving force to move the lens module 200 in a first direction intersecting the optical axis C, and the driving assembly 500 (e.g., the driving coil 510 and the driving magnet 520) may generate driving force to move the lens module 200 in a second direction intersecting the optical axis C.

The driving assemblies 400 and 500 may have a specific shape. Hereinafter, configurations of the driving assemblies 400 and 500 will be described with reference to FIG. 2.

Referring to FIG. 2, the driving magnets 420 and 520 may be configured to include a plurality of polarity boundary lines 4202, 5202, 4204, and 5204. For example, the driving magnets 420 and 520 may be configured such that two S poles are formed on opposing side surfaces of an N pole or two N poles are formed on opposing side surfaces of an S pole. The plurality of polarity boundary lines 4202, 5202, 4204, and 5204 may be formed at intervals in a direction intersecting the optical axis C. For example, N and S poles of the driving magnets 420 and 520 may be formed in a direction intersecting the optical axis C. Regions forming the N and S poles of the driving magnets 420 and 520 may be formed to have different distances. For example, a distance, or length, Lmd of a first polarity formation region (e.g., an N pole in reference to FIG. 2) that may be central portions of the driving magnets 420 and 520 may be greater than a distance, or length, Lmt of each of second polarity formation regions (e.g., S poles in reference to FIG. 2), neighboring the first polarity formation region. In other words, a distance from the first polarity boundary lines 4202 and 5202 to respective second polarity boundary lines 4204 and 5204 may be greater than a distance from the first polarity boundary lines 4202 and 5202 to ends of the respective driving magnets 420 and 520 closest to the first polarity boundary lines 4202 and 5202, respectively. As another example, the length Lmd of the first polarity formation region may be equal to or greater than a total sum of the lengths Lmt+Lmt of the second polarity formation regions.

The driving coils 410 and 510 may be disposed to oppose the central portions of the driving magnets 420 and 520, respectively. For example, the driving coil 410 may be disposed to oppose a first polarity formation region (e.g., an N pole based on FIG. 2) formed in the central portion of the driving magnet 420, and the driving coil 510 may be disposed to oppose a first polarity formation region (e.g., an N pole based on FIG. 2) formed in the central portion of the driving magnet 520. The driving coil 410 may include a portion extending along the polarity boundary lines 4202 and 4204 of the driving magnet 420, and the driving coil 510 may include a portion extending along the polarity boundary lines 5202 and 5204 of the driving magnet 520. For example, first extensions of the driving coils 410 and 510 wound to have a generally rectangular shape may be respectively formed along the first polarity boundary lines 4202 and 5202, second extensions of the driving coils 410 and 510 may be respectively formed along an upper edge of the first polarity formation region, third extensions of the driving coils 410 and 510 may be respectively formed along the second polarity boundary lines 4204 and 5204, and fourth extensions of the driving coils 410 and 510 may be respectively formed along a lower edge of the first polarity formation region. The driving coils 410 and 510 may have a predetermined size relationship with the driving magnets 420 and 520, respectively. For example, a length Lc of each of the driving coils 410 and 510 may be less than a length Lm of the respective driving magnets 420 and 520. Alternatively, a height hc of each of the driving coils 410 and 510 may be greater than a height hm of the respective driving magnets 420 and 520.

Since the driving assembly 400 may have a structure in which a magnetic field generated between the driving coil 410 and the driving magnet 420 may be recovered by the driving magnet 420, and the driving assembly 500 may have a structure in which a magnetic field generated between the driving coil 510 and the driving magnet 520 may be recovered by the driving magnet 520, a magnetic field effect on one or more other driving assemblies adjacent to the driving assemblies 400 and 500 or a magnetic field effect on other electronic component(s) adjacent to the camera module 10 may be effectively reduced.

Figure 3:
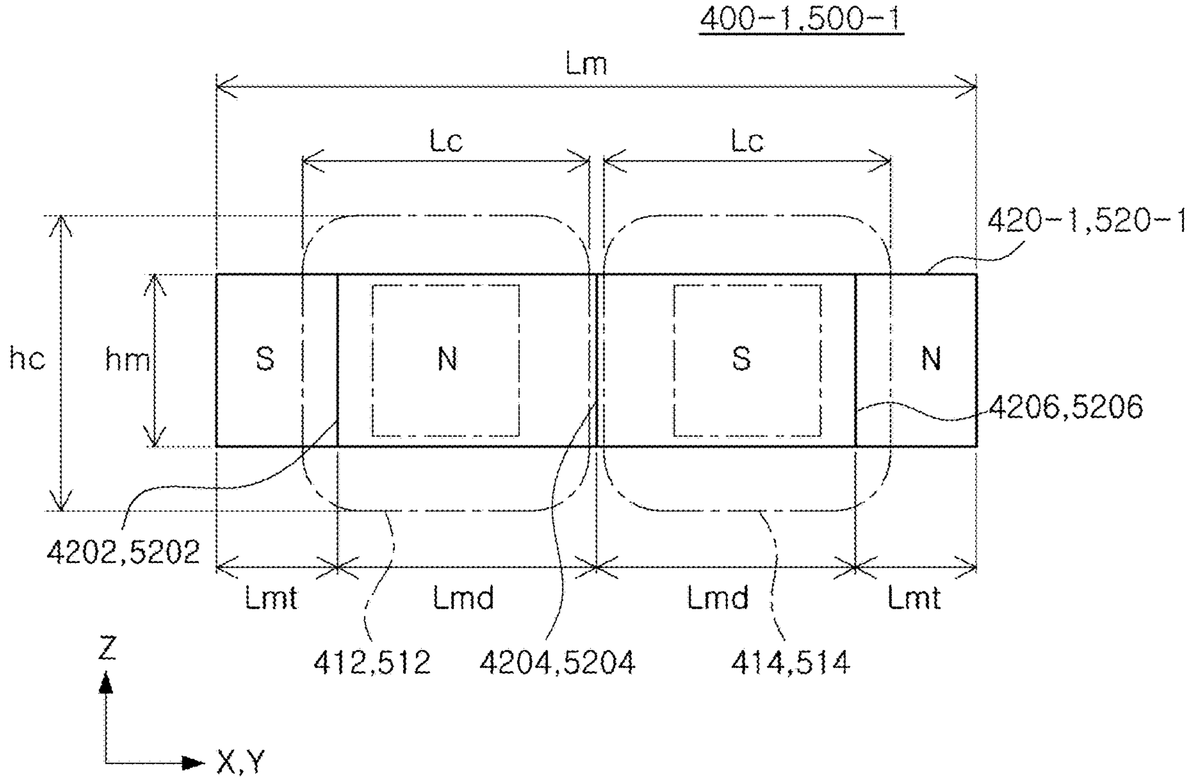
FIG. 3 is a front view of a driving assembly, according to an embodiment.

FIG. 3 illustrates driving assemblies 400-1 and 500-1, which are modified forms of the driving assemblies 400 and 500, according to an embodiment.

Referring to FIG. 3, the driving assemblies 400-1 and 500-1 may each have a form in which a plurality of driving coils oppose a driving magnet. For example, a driving magnet 420-1 may be disposed to oppose two (2) driving coils 412 and 414, and a driving magnet 520-1 may be disposed to oppose two (2) driving coils 512 and 514.

The driving magnets 420-1 and 520-1 may be configured to have four (4) or more polarities, respectively. For example, the driving magnets 420-1 and 520-1 may be respectively configured such that an S pole, an N pole, an S pole, and an N pole are sequentially formed in a direction intersecting an optical axis C. The driving magnet 420-1 may be configured such that three (3) or more polarity boundary lines (e.g., 4202, 4204, and 4206) are formed, and the driving magnet 520-1 may be configured such that three (3) or more polarity boundary lines (e.g., 5202, 5204, and 5206) are formed. For example, the driving magnets 420-1 and 520-1 may be configured such that respective first polarity boundary lines 4202 and 5202, respective second polarity boundary lines 4204 and 5204, and respective third polarity boundary lines 4206 and 5206 are formed at intervals in a direction intersecting the optical axis C.

The driving magnets 420-1 and 520-1 may be configured such that a length of a polarity formation region respectively formed in central portions thereof and a length of a polarity formation region respectively formed in outermost side portions thereof are different. For example, a length Lmd of a polarity formation region respectively formed in central portions of the driving magnets 420-1 and 520-1 may be greater than a length Lmt of a polarity formation region respectively formed in outermost side portions of the driving magnets 420-1 and 520-1. As another example, the length Lmd of the polarity formation region respectively formed in the central portions of the driving magnets 420-1 and 520-1 may be equal to or greater than a total sum of the lengths Lmt+Lmt of the polarity formation regions respectively formed in the outermost side portions of the driving magnets 420-1 and 520-1.

The driving coils 412 and 414 may be arranged to oppose polarities formed in a central portion of the driving magnet 420-1, and the driving coils 512 and 514 may be arranged to oppose polarities formed in a central portion of the driving magnet 520-1. For example, the driving coils 412 and 414 may be disposed to respectively oppose an N pole and an S pole formed in the central portion of the driving magnet 420-1, and the driving coils 512 and 514 may be disposed to respectively oppose an N pole and an S pole formed in the central portion of the driving magnet 520-1. The driving coils 412 and 414 may include portions extending along the polarity boundary lines 4202 and 4206 of the driving magnet 420-1, and the driving coils 512 and 514 may include portions extending along the polarity boundary lines 5202 and 5206 of the driving magnet 520-1. For example, a portion of the driving coil 412 may be formed to extend along the first polarity boundary line 4202, and a portion of the driving coil 414 may be formed to extend along the third polarity boundary line 4206. For example, a portion of the driving coil 512 may be formed to extend along the first polarity boundary line 5202, and a portion of the driving coil 514 may be formed to extend along the third polarity boundary line 5206. In addition, other portions of the driving coils 412 and 414 may have a predetermined separation distance from the second polarity boundary line 4204, and may be formed to extend parallel to the second polarity boundary line 4204. Similarly, other portions of the driving coils 512 and 514 may have a predetermined separation distance from the second polarity boundary line 5204, and may be formed to extend parallel to the second polarity boundary line 5204. The driving coils 412, 512, 414, and 514 may have a predetermined size relationship with the respective driving magnets 420-1 and 520-1. For example, a length Lc of each of the driving coils 412, 512, 414, and 514 may be less than a length Lm of the respective driving magnets 420-1 and 520-1. Alternatively, a height hc of each of the driving coils 412, 512, 414, and 514 may be greater than a height hm of the respective driving magnets 420-1 and 520-1.

Since the driving assembly 400-1 may have a structure in which the driving coils 412 and 414 and the driving magnet 420-1, formed with a plurality of polarities, oppose each other, and the driving assembly 500-1 may have a structure in which the driving coils 512 and 514 and the driving magnet 520-1, formed with a plurality of polarities, oppose each other, a location of the lens module 200 may be corrected by strong driving force.

Figure 4:
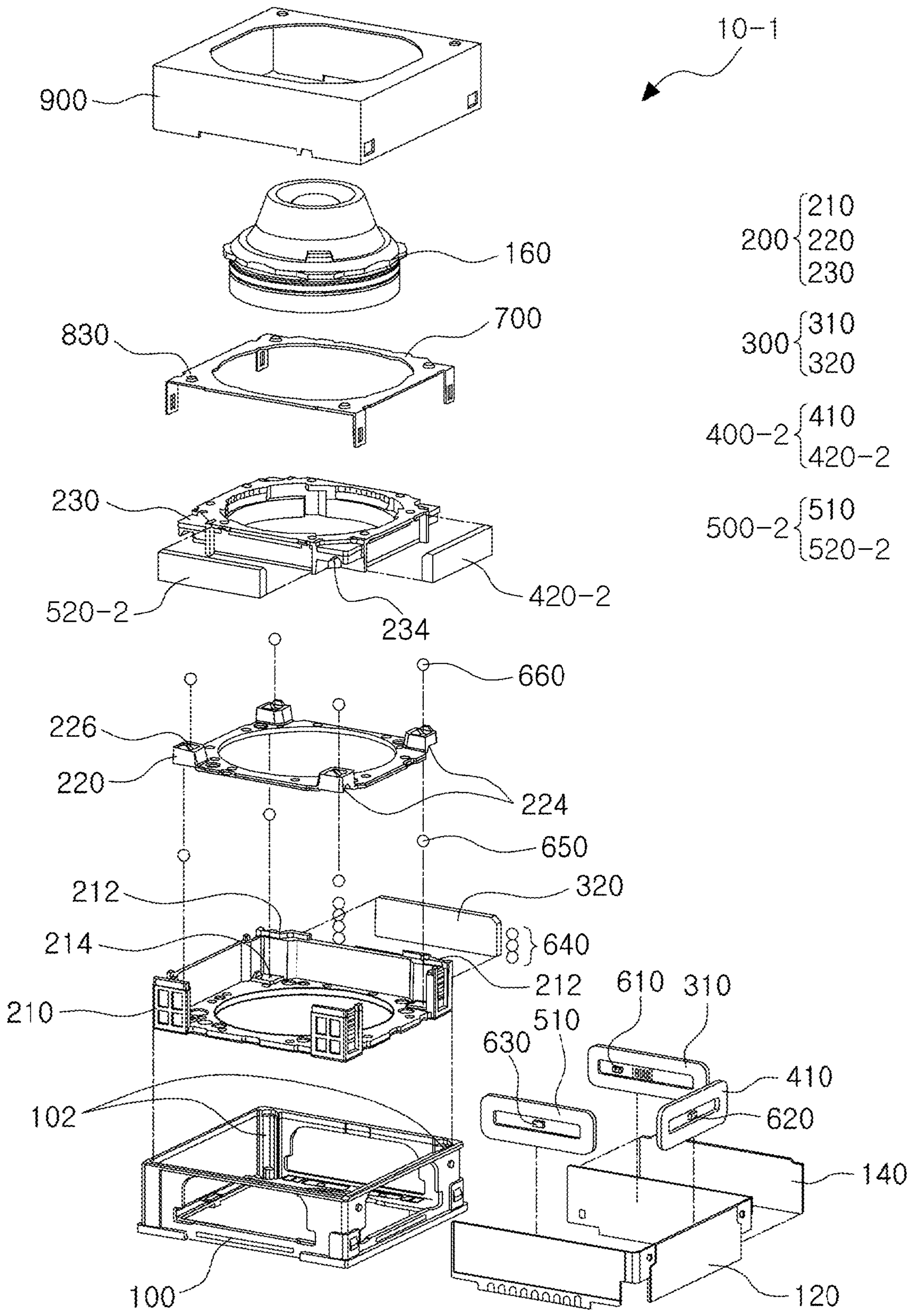
FIG. 4 is an exploded perspective view of a camera module, according to an embodiment.
Figure 5:
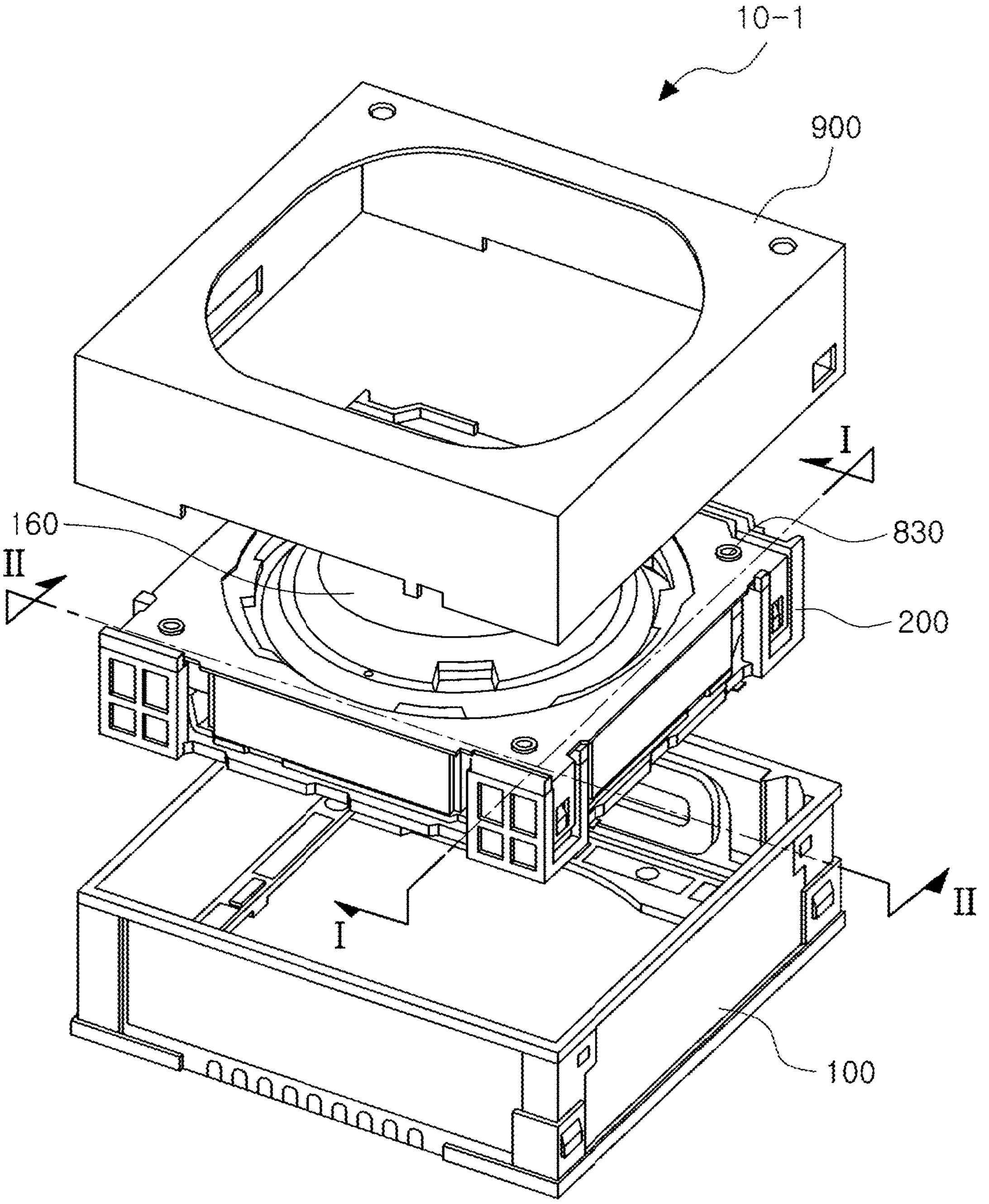
FIG. 5 is a partially assembled perspective view of the camera module illustrated in FIG. 4.

FIGS. 4 and 5 illustrate a configuration of a camera module 10-1, according to an embodiment.

The camera module 10-1 may be mounted in a portable electronic product, as in the above-described embodiment. For example, the camera module 10-1 may be mounted on a mobile phone, a laptop computer, or the like. An application of the camera module 10-1 is not limited to the above-mentioned electronic products. For example, the camera module 10-1 may be mounted in an automated teller machine (ATM), a television for interactive broadcasting, or the like.

The camera module 10-1 may include, for example, the housing 100, a lens barrel 160, the lens module 200, a first driving assembly 300, and second driving assemblies 400-2 and 500-2, as illustrated in FIG. 5. A configuration of the camera module 10-1 is not limited to the above-mentioned members. For example, the camera module 10-1 may further include a substrate 120, a yoke 140, position detecting sensors 610, 620, and 630, a first ball bearing 640, a second ball bearing 650, a third ball bearing 660, a cover member 700, a buffer member 830, and a shield can 900.

The housing 100 may be formed as a cube having open upper and lower surfaces. For example, the housing 100 may be configured in a substantially hexahedral shape. Three (3) side surfaces of the housing 100 may be partially incised. Driving force of the first driving assembly 300 and the second driving assemblies 400-2 and 500-2 may be transmitted to the lens module 200 through the incised side surfaces. A pair of first guide grooves 102 may be formed inside a first surface of the housing 100. The first guide groove 102 may be formed to be elongated in a height direction of the housing 100. The first ball bearing 640 may be disposed in the first guide groove 102.

The lens module 200 may be disposed inside the housing 100. The lens module 200 may be configured to move in a direction of the optical axis C (FIG. 1) and in a direction intersecting the optical axis C within the housing 100. The lens module 200 may be include a plurality of members. For example, the lens module 200 may include a first frame 210, a second frame 220, and a third frame 230.

The first frame 210 may be formed to be open in a vertical direction and to have two (2) closed side surfaces and two (2) open side surfaces. A pair of second guide grooves 212 may be formed on a first surface of the first frame 210. The first ball bearing 640 may be disposed in the second guide groove 212. The first frame 210 may be disposed inside the housing 100. The first frame 210 may be configured to move in the direction of the optical axis C with respect to the housing 100. For example, the first frame 210 may be in point contact with or in line contact with the first ball bearing 640 to move in the direction of the optical axis C. Driving force required for driving the first frame 210 may be provided by the first driving assembly 300. A first groove 214 may be formed in each of four (4) internal corners of the first frame 210. The first groove 214 may have an elongated shape. For example, the first groove 214 may be formed to be elongated in a first direction intersecting the optical axis C. The second ball bearing 650 may be disposed in the first groove 214.

The second frame 220 may have a generally thin plate shape that is open in the vertical direction. The second frame 220 may be disposed on the first frame 210, and may be configured to move in the first direction intersecting the optical axis C. For example, the second frame 220 may be enabled to move in the first direction intersecting the optical axis C by the second ball bearing 650 being disposed between the first frame 210 and the second frame 220. Driving force required for driving the second frame 220 may be provided by the second driving assembly 400-2. A second groove 224 and a third groove 226 may be formed in the second frame 220. The second groove 224 may be formed in a lower portion of the second frame 220, and the third groove 226 may be formed in an upper portion of the second frame 220. The second groove 224 may be formed to be elongated in the first direction intersecting the optical axis C. The second groove 224 may form a space for accommodating the second ball bearing 650, together with the first groove 214. The third groove 226 may be formed to be elongated in a second direction intersecting the optical axis C and the first direction.

The third frame 230 may be formed to be open in the vertical direction and to have a predetermined height. The third frame 230 may be disposed on the second frame 220, and may be configured to move in the second direction intersecting the optical axis C. For example, the third frame 230 may be enabled to move in the second direction intersecting the optical axis C by the third ball bearing 660 being disposed between the second frame 220 and the third frame 230. Driving force required for driving the third frame 230 may be provided by the second driving assembly 400-2. A fourth groove 234 may be formed in a lower portion of the third frame 230. The fourth groove 234 may be formed to be elongated in the second direction intersecting the optical axis C. The fourth groove 234 may form a space for accommodating the third ball bearing 660, together with the third groove 226.

The lens barrel 160 may be combined with the third frame 230. The lens barrel 160 may be moved by the lens module 200 in the direction of the optical axis C and in a direction intersecting the optical axis C. For example, the lens barrel 160 may be moved in a direction of the optical axis C by the first frame 210. As another example, the lens barrel 160 may be moved in the first and second directions intersecting the optical axis C by the second frame 220 and the third frame 230. Movement of the lens barrel 160 in the direction of the optical axis C may enable focus adjustment of the camera module 10-1, and movement of the lens barrel 160 in a direction intersecting the optical axis C may perform an optical image stabilization (OIS) function of the camera module 10-1.

The first driving assembly 300 may be configured to move the lens module 200 in the direction of the optical axis C. For example, the first driving assembly 300 may provide driving force required to move the first frame 210 in the direction of the optical axis C. The first driving assembly 300 may include a first driving coil 310 and a first driving magnet 320. The first driving coil 310 may be disposed on the first surface of the housing 100, and the first driving magnet 320 may be disposed on the first surface of the first frame 210. The first surface of the housing 100 and the first surface of the first frame 210 may be arranged to oppose each other.

The second driving assemblies 400-2 and 500-2 may be configured to move the lens module 200 in the first and second directions intersecting the optical axis C. For example, the second driving assemblies 400-2 and 500-2 may provide driving force required for movement of the second frame 220 and the third frame 230. The second driving assemblies 400-2 and 500-2 may include second driving coils 410 and 510, respectively, and a second driving magnets 420-2 and 520-2, respectively. The second driving coils 410 and 510 may be arranged on second and third surfaces of the housing 100, respectively, and the second driving magnets 420-2 and 520-2 may be arranged on second and third surfaces of the third frame 230, respectively. For reference, the second surface of the housing 100 may be a surface opposing the second surface of the third frame 230, and the third surface of the housing 100 may be a surface opposing the third surface of the third frame 230.

The camera module 10-1 may include components for supplying a current to the driving assemblies 300, 400-2, and 500-2. For example, the camera module 10-1 may include the substrate 120. The substrate 120 may be configured to supply a current required for driving the first driving assembly 300 and the second driving assemblies 400-2 and 500-2. For example, the substrate 120 may supply a current to the first driving coil 310 and the second driving coils 410 and 510. The substrate 120 may be configured to provide a space in which the first driving coil 310 and the second driving coils 410 and 510 are arranged. For example, the substrate 120 may be disposed to surround the first surface, the second surface, and the third surface of the housing 100, to provide a space in which the first driving coil 310 and the second driving coils 410 and 510 are arranged in the housing 100. The yoke 140 may be disposed on one side of the substrate 120.

The camera module 10-1 may include components for detecting a position of the lens module 200. For example, the camera module 10-1 may include a first position detecting sensor 610, a second position detecting sensor 620, and a third position detecting sensor 630. The first position detecting sensor 610 may detect a displacement corresponding to movement of the lens module 200 in the direction of the optical axis C, and the second position detecting sensor 620 and the third position detecting sensor 630 may detect a displacement corresponding to movement of the lens module 200 in respective directions intersecting the optical axis C. The position detecting sensors 610, 620, and 630 may be hall sensors that detect a magnitude of magnetic field generated from the driving assemblies 300, 400-2, and 500-2, respectively. The position detecting sensors 610, 620, and 630 are not limited to hall sensors. The position detecting sensors 610, 620, and 630 may be respectively disposed in a space respectively surrounded by the driving coils 310, 410, and 510. For example, the first position detecting sensor 610 may be disposed inside the first driving coil 310, and the second position detecting sensor 620 and the third position detecting sensor 630 may be disposed inside the second driving coils 410 and 510, respectively.

The camera module 10-1 may include a structure for binding the first frame 210 to the third frame 230. For example, the camera module 10-1 may include the cover member 700 configured to bind the second frame 220 and the third frame 230 to the first frame 210. The cover member 700 may be coupled to the first frame 210 in a state in which the first frame 210 to the third frame 230 are stacked, to prevent releases of the second frame 220 and the third frame 230 from the first frame 210. The buffer member 830 may be formed in the cover member 700. For example, a plurality of buffer members 830, protruding in an upward direction, may be formed in an upper portion of the cover member 700. The buffer member 830 may reduce impact due to collision between the lens module 200 and the shield can 900.

The camera module 10-1 may include a structure for shielding electromagnetic waves. For example, the camera module 10-1 may include the shield can 900. The shield can 900 may be formed to have a shape surrounding the housing 100, the lens module 200, and the cover member 700. Therefore, intrusion or emission of harmful electromagnetic waves generated outside or inside the camera module 10-1 may be blocked by the shield can 900.

Moving structures of the second frame 220 and the third frame 230 will be described below with reference to FIGS. 6 and 7.

Figure 6:
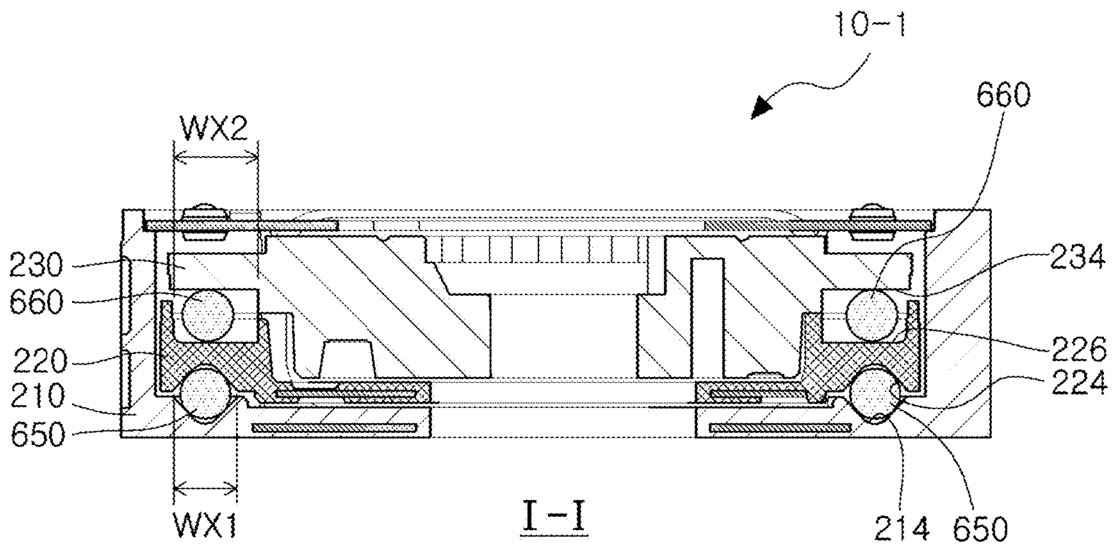
FIGS. 6 and 7 are cross-sectional views of a moving body illustrated in FIG. 5.
Figure 7:
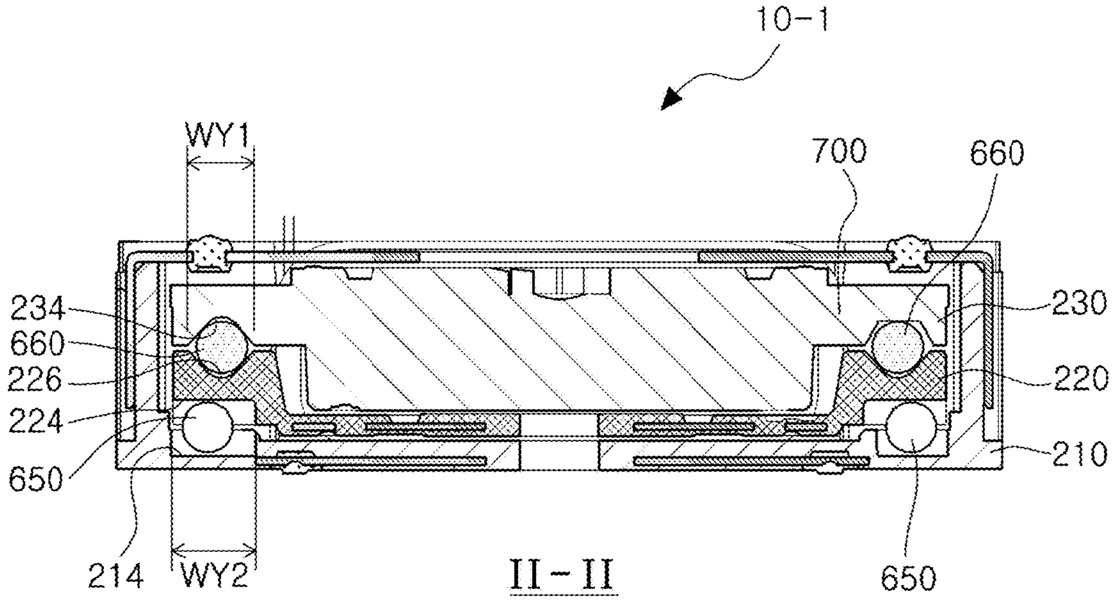

Referring to FIGS. 6 and 7, the first frame 210, the second frame 220, and the third frame 230, which constitute the lens module 200, may be stacked and coupled in a direction of the optical axis. The first frame 210 may be configured to accommodate the second frame 220 and the third frame 230. For example, the second frame 220 and the third frame 230 may be configured to move in a direction intersecting the optical axis C, while being accommodated inside the first frame 210.

The second and third ball bearings 650 and 660 may be arranged between the first frame 210 to the third frame 230. For example, the second ball bearing 650 may be disposed between the first frame 210 and the second frame 220, and the third ball bearing 660 may be disposed between the second frame 220 and the third frame 230.

Spaces for disposing the ball bearings may be formed in the first frame 210 to the third frame 230. For example, the first groove 214 may be formed in an upper portion of the first frame 210, the second groove 224 and the third groove 226 may be respectively formed in the upper and lower portions of the second frame 220, and the fourth groove 234 may be formed in the lower portion of the third frame 230.

Lengths of the grooves 224 and 234 respectively formed the lower portions of the second frame 220 and the third frame 230 may be formed differently, depending on moving directions of the second frame 220 and the third frame 230. For example, a length (WY2) of the groove 224 in the first direction may be greater than a length (WX1) of the groove 224 in the second direction, and a length (WX2) of the groove 234 in the second direction may be greater than a length (WY1) of the groove 234 in the first direction. In addition, the length (WY2) of the groove 224 in the first direction may be greater than a length (WY1) of each of the grooves 226 and 234 in the first direction, and the length (WX2) of the groove 234 in the second direction may be greater than a length (WX1) of each of the grooves 214 and 224 in the second direction.

Since the length of the groove 224 of the second frame 220 in the first direction may be greater than a length of the groove 214 of the first frame 210 in the first direction, movement of the second frame 220 relative to the first frame 210 is possible. In addition, since the length of the grooves 234 of the third frame 230 in the second direction may be greater than a length of the grooves 226 of the second frame 220 in the second direction, movement of the third frame 230 relative to the second frame 220 is possible.

Next, an arrangement of the lens module 200 and the driving assemblies 300, 400-2, and 500-2 will be described with reference to FIGS. 8 and 9.

Figure 8:
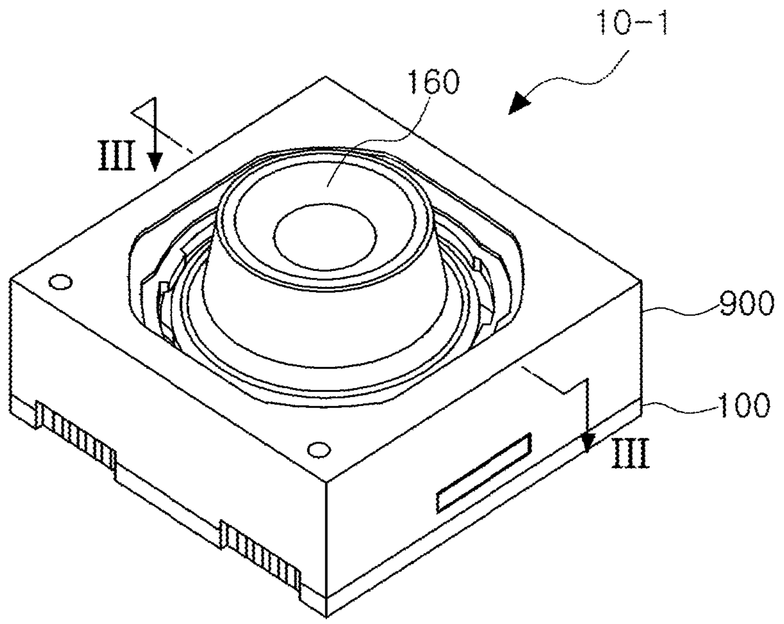
FIG. 8 is an assembled perspective view of the camera module illustrated in FIGS. 4 and 5.
Figure 9:
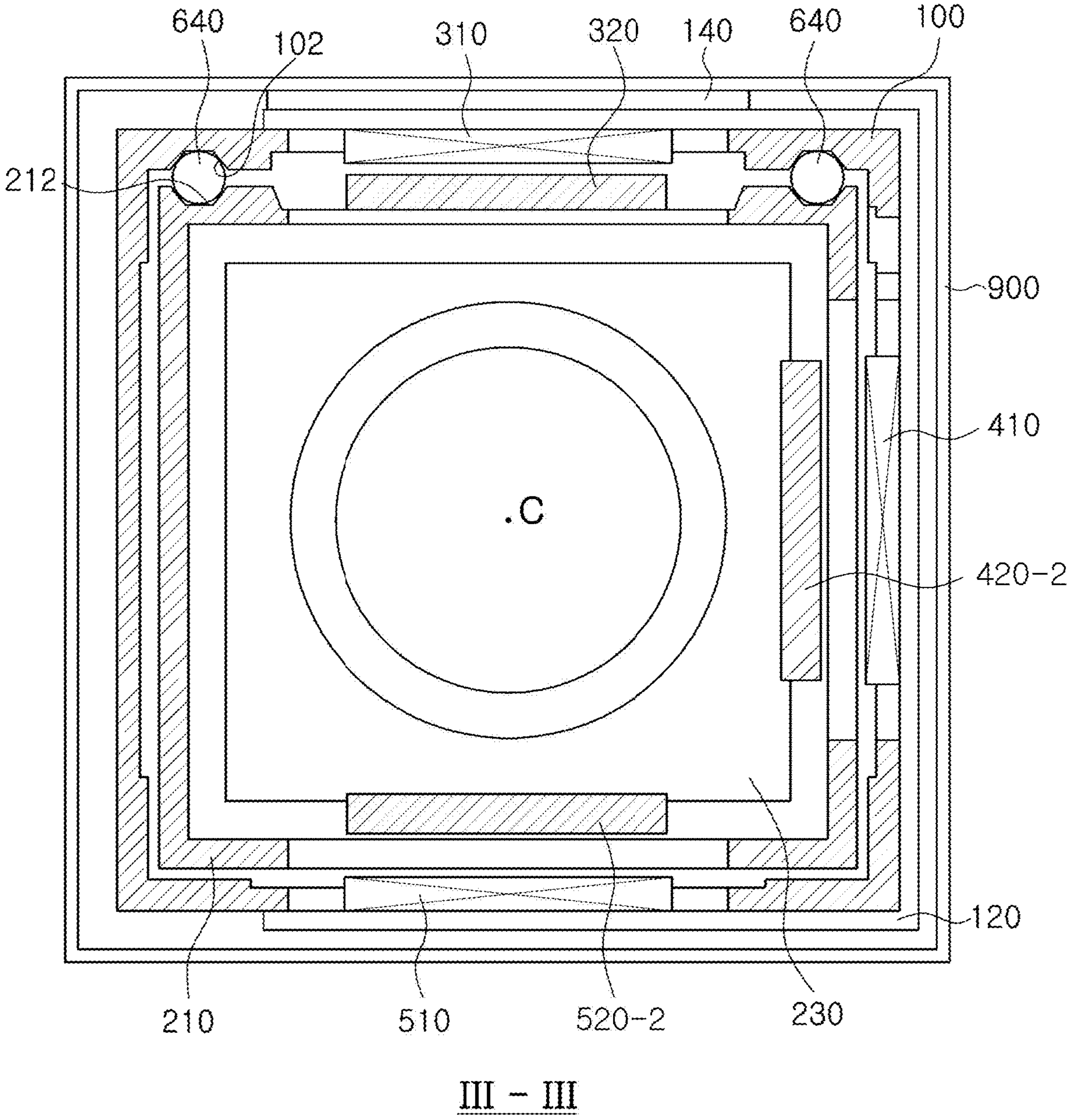
FIG. 9 is a cross-sectional view along line III-III of FIG. 8.

Referring to FIGS. 8 and 9, driving assemblies 300, 400-2, and 500-2 may be sequentially disposed on the first to third surfaces of the housing 100 around the lens module 200. For example, the first driving assembly 300 may be disposed on the first surface of the housing 100 and the first surface of the first frame 210, the second driving assembly 400-2 may be disposed on the second surface of the housing 100 and the second surface of the third frame 230, and the second driving assembly 500-2 may be disposed on the third surface of the housing 100 and the third surface of the third frame 230.

The lens module 200 may be moved in the direction of the optical axis C and in a direction intersecting the optical axis C by the driving assemblies 300, 400-2, and 500-2. For example, the lens module 200 may be moved in the direction of the optical axis C by the first driving assembly 300 (e.g., the first driving coil 310 and the first driving magnet 320). As another example, either one or both of the second frame 220 and the third frame 230 of the lens module 200 may move in the first and second directions intersecting the optical axis C, by combined force of the second driving assemblies 400-2 and 500-2 (e.g., the second driving coil 410, the second driving magnet 420-2, the second driving coil 510, and the second driving magnet 520-2).

The camera module 10-1 may be configured to minimize magnetic field interference due to magnetic force generated from a driving assembly. For example, since a magnetic field generated by the driving assembly of this embodiment has a tendency to be recovered to a driving magnet through a driving coil, magnetic field interference and magnetic field effects on a neighboring driving assembly or a neighboring electronic component may be minimized. Structures of the second driving assemblies 400-2 and 500-2, configured to minimize magnetic field interference, will be described with reference to FIGS. 10A to 10C.

Figure 10A:
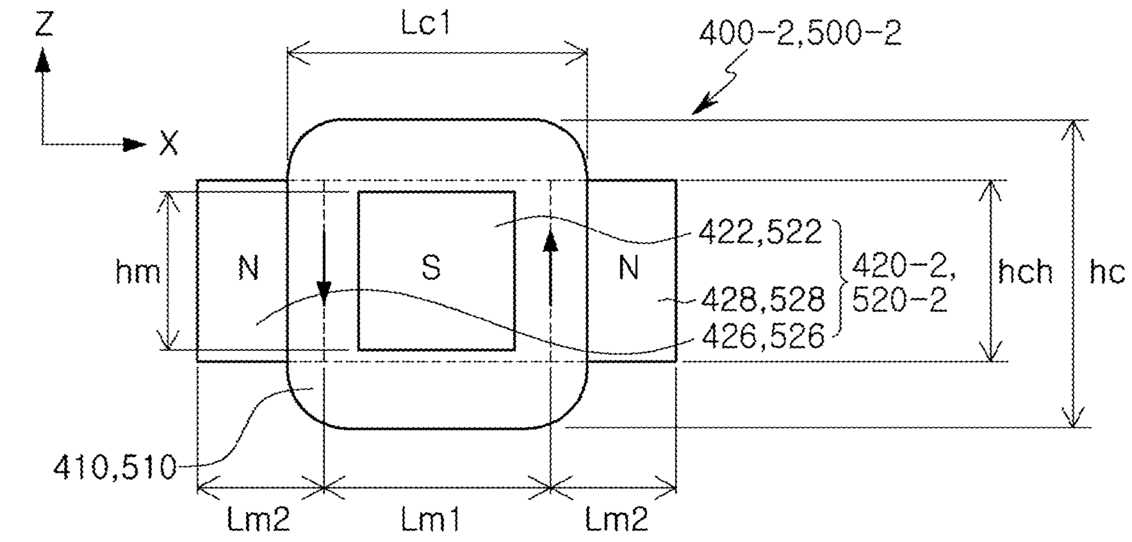
FIGS. 10A to 10C are configuration diagrams of driving assemblies illustrated in FIG. 9, according to an embodiment.
Figure 10B:
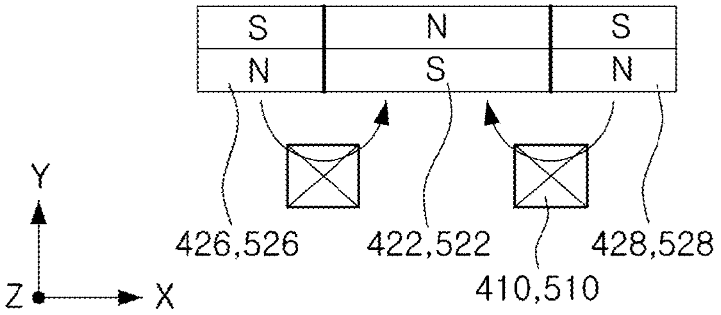
Figure 10C:
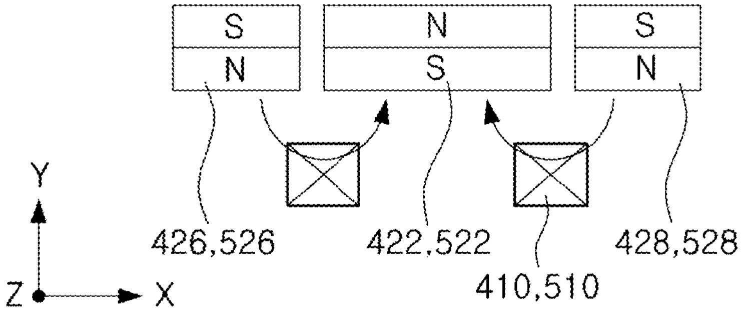

Referring to FIGS. 10A to 10C, the driving magnet 420-2 of the second driving assembly 400-2 may include the driving coil 410, a driving magnet member 422, and auxiliary magnet members 426 and 428. The driving magnet 520-2 of the second driving assembly 500-2 may include the driving coil 510, a driving magnet member 522, and auxiliary magnet members 526, and 528.

The driving coil 410 may be configured to oppose the driving magnet member 422 and the auxiliary magnet members 426 and 428. The driving coil 510 may be configured to oppose the driving magnet member 522 and the auxiliary magnet members 526 and 528. The driving coils 410 and 510 may be generally respectively configured to allow a current to flow along a boundary between the driving magnet member 422 and each of the auxiliary magnet members 426 and 428, and along a boundary between the driving magnet member 522 and each of the auxiliary magnet members 526 and 528.

The auxiliary magnet members 426 and 428 may be disposed on opposite sides of the driving magnet member 422, and auxiliary magnet members 526 and 528 may be disposed on opposite sides of the driving magnet member 522. For example, the auxiliary magnet member 426, the driving magnet member 422, and the auxiliary magnet member 428 may be sequentially arranged in a first direction or a second direction intersecting the optical axis C. Similarly, for example the auxiliary magnet member 526, the driving magnet member 522, and the auxiliary magnet member 528 may be sequentially arranged in a first direction or a second direction intersecting the optical axis C. As illustrated in FIG. 10, the auxiliary magnet members 426 and 428 may be arranged to have polarities different from the polarity of the driving magnet member 422 the first direction, and the auxiliary magnet members 526 and 528 may be arranged to have polarities different from the polarity of the driving magnet member 522 in the first direction. For example, polarities of one surface of the auxiliary magnet member 426, one surface of the driving magnet member 422, and one surface of the auxiliary magnet member 428 may be an N pole, an S pole, and an N pole, respectively, as illustrated in FIG. 10. Similarly, polarities of one surface of the auxiliary magnet member 526, one surface of the driving magnet member 522, and one surface of the auxiliary magnet member 528 may be an N pole, an S pole, and an N pole, respectively. The driving magnets 422 and 522, and the auxiliary magnet members 426, 428, 526, and 528 may have polarities in a direction intersecting the first direction. For example, first and second polarities of the driving magnet members 422 and 522 and first and second polarities of the auxiliary magnet members 426, 428, 526, and 528 may be formed in a direction intersecting the first direction (in a direction opposing the respective driving coils 410 and 510), as illustrated in FIG. 10. The auxiliary magnet members 426, 428, 526, and 528 may have a predetermined size relationship with the respective driving magnets 422 and 522. For example, a length Lm2 of each of the auxiliary magnet members 426, 428, 526, and 528 in the first direction may be less than a length Lm1 of the respective driving magnet members 422 and 522 in the first direction.

The auxiliary magnet members 426, 428, 526, and 528 may be integrally formed with the respective driving magnet members 422 and 522. For example, the auxiliary magnet members 426, 428, 526, and 528, and the driving magnet members 422 and 522 may be formed by a series of processes that form one or more polarities in a single magnetic body, as shown in FIGS. 10A and 10B. Alternatively, the auxiliary magnet members 426, 428, 526, and 528 may be disposed at a predetermined distance from the respective driving magnet members 422 and 522, as shown in FIG. 10C. For example, a physical gap may be formed, or a neutral region having substantially no polarity may be formed between the auxiliary magnet members 426, 428, 526, and 528, and the respective driving magnet members 422 and 522.

The driving coils 410 and 510 may have a predetermined size relationship with the respective driving magnet members 422 and 522, and the respective auxiliary magnet members 426, 428, 526, and 528. For example, a length Lc1 of each of the driving coils 410 and 510 in the first direction may be greater than the length Lm1 of the respective driving magnet members 422 and 522 in the first direction, and the length Lm2 of each of the respective auxiliary magnet members 426, 428, 526 and 528 in the first direction. As another example, the length Lc1 of each of the driving coils 410 and 510 may be a total sum (i.e., Lm2+Lm1+Lm2) of the length of the respective driving magnet members 422 and 522 and the length of the respective auxiliary magnet members 426, 428, 526, and 528, arranged in the first direction. As another example, a height hc of an outer circumferential surface of each of the driving coils 410 and 510 may be greater than a height hm of the respective driving magnet members 422 and 522 and the respective auxiliary magnet members 426, 428, 526 and 528. As another example, a height hch of an inner circumferential surface of each of the driving coils 410 and 510 may be less than the height hm of the respective driving magnet members 422 and 522 and the respective auxiliary magnet members 426, 428, 526 and 528. Since the driving coils 410 and 510, configured as described above, may be configured to allow a current to flow along a boundary between each of the driving magnets 422 and 522 and each of the auxiliary magnets 426, 428, 526 and 528, and an edge of each of the driving magnets 422 and 522, a magnetic field may be formed to provide attractive force and repulsive force in a direction opposing the driving magnets 422 and 522.

The second driving assemblies 400-2 and 500-2, configured as described above, may be configured such that a magnetic field generated by the respective driving coils 410 and 510, the respective driving magnet members 422 and 522, and the respective auxiliary magnet members 426, 428, 526, and 528 is focused on a central portion of winding of the driving coils 410 and 510. Therefore, a camera module 10-1 may minimize magnetic field interference that may be caused by the second driving assemblies 400-2 and 500-2.

Figure 11A:
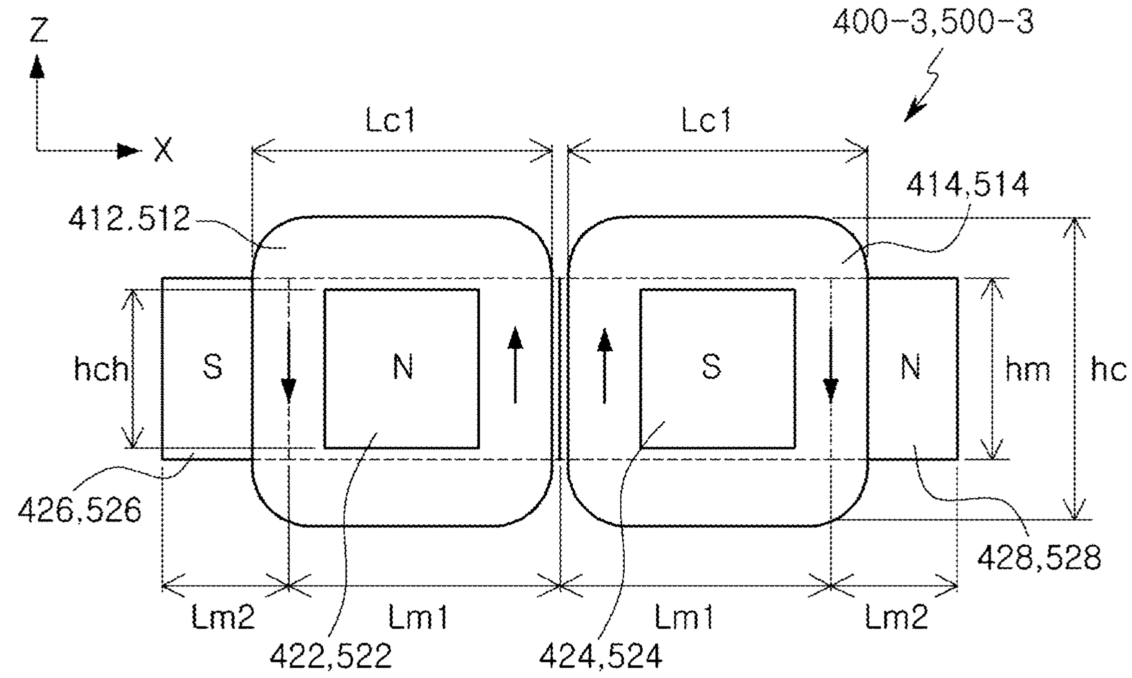
FIGS. 11A to 11C are configuration diagrams of driving assemblies, according to an embodiment.
Figure 11B:
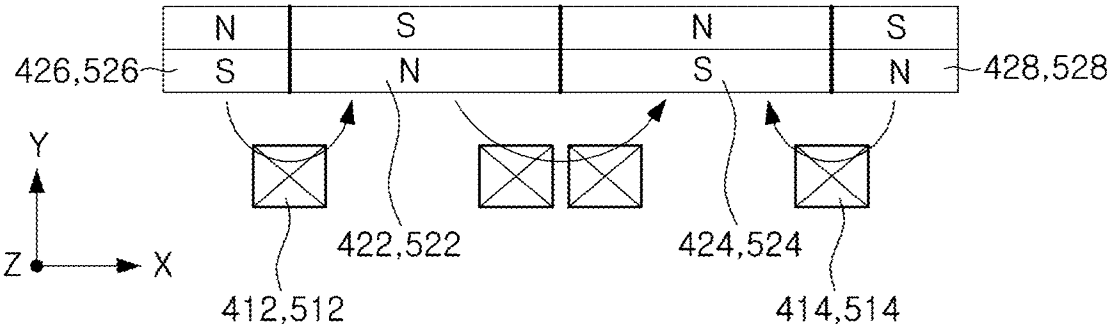
Figure 11C:
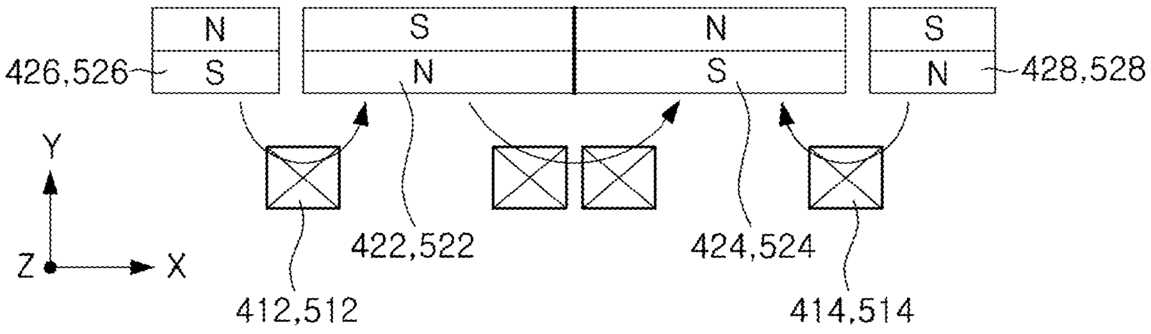

FIG. 11 illustrates second driving assemblies 400-3 and 500-3, which are modified forms of the driving assemblies 400-2 and 500-2, according to an embodiment.

Referring to FIG. 11, the second driving assembly 400-3 may include driving coils 412 and 414, driving magnet members 422 and 424, and auxiliary magnet members 426 and 428. The second driving assembly 500-3 may include driving coils 512 and 514, driving magnet members 522 and 524, and auxiliary magnet members 526 and 528.

The driving coils 412 and 414 may be configured to oppose the driving magnet members 422 and 424, respectively, and the auxiliary magnet members 426 and 428, respectively. The driving coils 512 and 514 may be configured to oppose the driving magnet members 522 and 524, respectively, and the auxiliary magnet members 526, and 528, respectively. The driving coils 412 and 414 may be generally configured to allow a current to flow along a boundary of each of the driving magnet members 422 and 424. The driving coils 512 and 514 may be generally configured to allow a current to flow along a boundary of each of the driving magnet members 522 and 524.

The driving magnet members 422 and 424 may be sequentially arranged in the first direction. The driving magnet members 522 and 524 may be sequentially arranged in the first direction. The auxiliary magnet members 426 and 428 may be disposed on one side of the driving magnet members 422 and 424, respectively. The auxiliary magnet members 526 and 528 may be disposed on one side of the driving magnet members 522 and 524, respectively.

For example, as illustrated in FIG. 11, the auxiliary magnet member 426, the driving magnet member 422, the driving magnet member 424, and the auxiliary magnet member 428 may be continuously arranged in the first direction. For example, as illustrated in FIG. 11, the auxiliary magnet member 526, the driving magnet member 522, the driving magnet member 524, and the auxiliary magnet member 528 may be continuously arranged in the first direction.

The auxiliary magnet members 426, 428, 526, and 528 may be arranged to have different polarities from the driving magnet members 422, 424, 522, and 524, respectively, in the first direction. For example, polarities of one surface of the auxiliary magnet member 426, one surface of the driving magnet member 422, one surface of the driving magnet member 424, and one surface of the auxiliary magnet member 428 may be an S pole, an N pole, an S pole, and an N pole, respectively, as illustrated in FIG. 11. For example, polarities of one surface of the auxiliary magnet member 526, one surface of the driving magnet member 522, one surface of the driving magnet member 524, and one surface of the auxiliary magnet member 528 may be an S pole, an N pole, an S pole, and an N pole, respectively. The driving magnet members 422, 424, 522, and 524, and the auxiliary magnet members 426, 428, 526, and 528 may have polarities in a direction intersecting the first direction. For example, first and second polarities of the driving magnet members 422, 424, 522, and 524, and first and second polarities of the auxiliary magnet members 426, 428, 526, and 528 may be respectively formed in a direction intersecting the first direction (in a direction opposing the respective driving coils 412, 414, 512, and 514), as illustrated in FIG. 11. The auxiliary magnet members 426, 428, 526, and 528 may respectively have a predetermined size relationship with the driving magnet members 422, 424, 522, and 524. For example, a length Lm2 of each of the auxiliary magnet members 426, 428, 526, and 528 in the first direction may be less than a length Lm1 of the respective driving magnet members 422, 424, 522, and 524 in the first direction.

The driving coils 412, 414, 512, and 514 may have a predetermined size relationship with the driving magnet members 422, 424, 522, and 524, respectively, and the auxiliary magnet members 426, 428, 526, and 528, respectively. For example, a length Lc1 of each of the driving coils 412, 414, 512, and 514 in the first direction may be greater than the length Lm1 of the respective driving magnet members 422, 424, 522, and 524 in the first direction, and the length Lm2 of the respective auxiliary magnet members 426, 428, 526, and 528 in the first direction. As another example, a height hc of an outer circumferential surface of each of the driving coils 412, 414, 512, and 514 may be greater than a height hm of the respective driving magnet members 422, 424, 522, and 524, and the respective auxiliary magnet members 426, 428, 526, and 528. As another example, a height hch of an inner circumferential surface of each of the driving coils 412, 414, 512, and 514 may be less than the height hm of the respective driving magnet members 422, 424, 522, and 524, and the respective auxiliary magnet members 426, 428, 526, and 528. Since the driving coils 412, 414, 512, and 514, configured as described above, may be configured to allow a current to flow along a boundary between each of the respective driving magnet members 422, 424, 522, and 524 and each of the respective auxiliary magnet members 426, 428, 526, and 528, and an edge of each of the driving magnet members 422, 424, 522, and 524, a magnetic field may be formed to provide attractive force and repulsive force in a direction opposing the driving magnet members 422, 424, 522, and 524.

Since a magnetic field generated by the driving coils 412, 414, 512, and 514, the respective driving magnet members 422, 424, 522, and 524, and the respective auxiliary magnet members 426, 428, 526, and 528 may be recovered by respective neighboring driving magnet members 422 and 522 and auxiliary magnet members 426 and 526, the second driving assemblies 400-3 and 500-3, configured as described above, may minimize magnetic field interference to neighboring electronic components or electronic devices.

Figure 12:
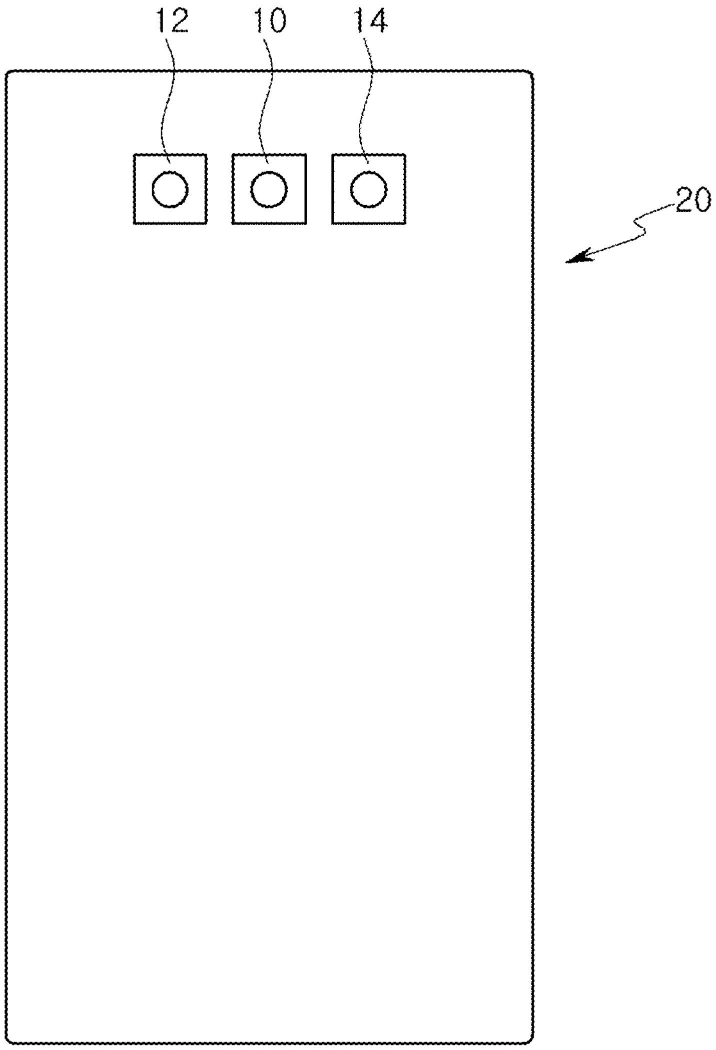
FIG. 12 illustrates a mobile terminal equipped with a camera module, according to an embodiment.

The camera module 10 may be mounted in a portable terminal 20, as illustrated in FIG. 12. The portable terminal 20 may further include other camera modules 12 and 14, in addition to the camera module 10. The camera modules 10, 12, and 14 may be arranged adjacently in a direction. One or more of the camera modules 12 and 14 may include a driving assembly for a focus adjustment function or an optical image stabilization (OIS) function. The driving assembly may be provided to include a magnet and a coil. Therefore, the camera modules 10, 12, and 14 may cause magnetic field interference to neighboring camera modules. Since the camera module 10 may include a driving assembly capable of minimizing the magnetic field interference as described above, it is possible to enable an accurate focus adjustment function or an accurate optical image stabilization (OIS) function of the camera modules 12 and 14. In addition, since the camera module 10 may be disposed between the camera modules 12 and 14 to suppress magnetic field interference between the camera module 12 and the camera module 14, a more compact arrangement of the camera modules 10, 12, and 14 may be implemented. Although the foregoing description refers to the camera module 10, the camera module 10-1 may also be implemented in the portable terminal 20.

Figure 13:
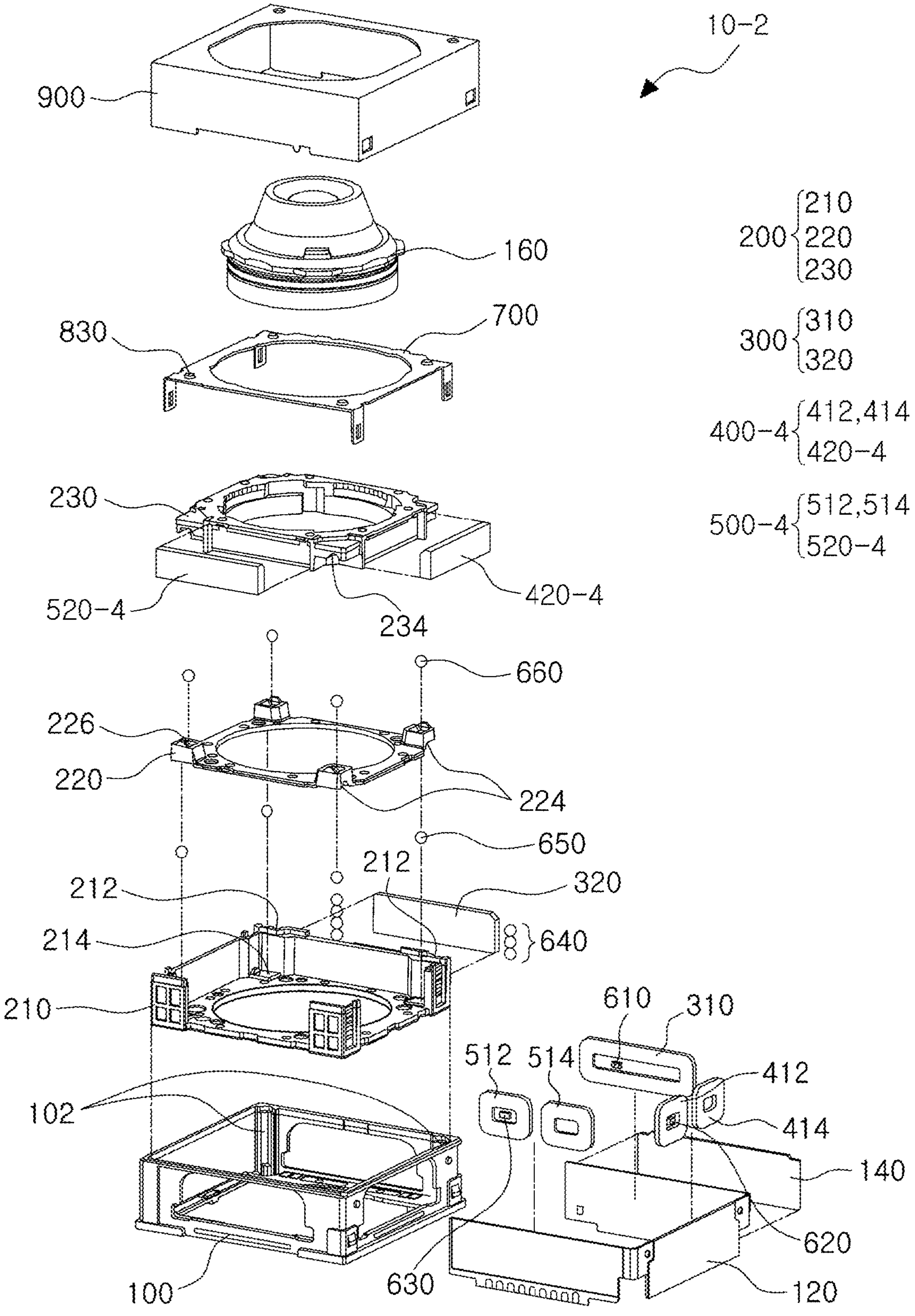
FIG. 13 is an exploded perspective view of a camera module, according to an embodiment.

FIG. 13 illustrates a camera module 10-2, according to an embodiment.

The camera module 10-2 may include, for example, the housing 100, the lens barrel 160, the lens module 200, the first driving assembly 300, and second driving assemblies 400-4 and 500-4. A configuration of the camera module 10-2 is not limited to the above-mentioned members. For example, the camera module 10-2 may further include the substrate 120, the yoke 140, the first position detecting sensor 610, the second position detecting sensor 620, the third position detecting sensor 630, the first ball bearing 640, the second ball bearing 650, the third ball bearing 660, the cover member 700, the buffer member 830, and the shield can 900.

The housing 100 may be formed as a cube having open upper and lower surfaces. For example, the housing 100 may be configured in a substantially hexahedral shape. Three (3) side surfaces of the housing 100 may be partially incised. Driving force of the first driving assembly 300 and the second driving assemblies 400-4 and 500-4 may be transmitted to the lens module 200 through the incised side surfaces. The pair of first guide grooves 102 may be formed inside the first surface of the housing 100. The first guide groove 102 may be formed to be elongated in the height direction of the housing 100. The first ball bearing 640 may be disposed in the first guide groove 102.

The lens module 200 may be disposed inside the housing 100. The lens module 200 may be configured to move in the direction of the optical axis C and in a direction intersecting the optical axis C within the housing 100. The lens module 200 may include a plurality of members. For example, the lens module 200 may include the first frame 210, the second frame 220, and the third frame 230.

The first frame 210 may be formed to be open in a vertical direction and to have two (2) closed side surfaces and two (2) open side surfaces. The pair of second guide grooves 212 may be formed on the first surface of the first frame 210. The first ball bearing 640 may be disposed in the second guide groove 212. The first frame 210 may be disposed inside the housing 100. The first frame 210 may be configured to move in a direction of the optical axis C (FIG. 1) with respect to the housing 100. For example, the first frame 210 may be in point contact with or in line contact with the first ball bearing 640 to move in the direction of the optical axis C. Driving force required for driving the first frame 210 may be provided by the first driving assembly 300. The first groove 214 may be formed in each of the four (4) internal corners of the first frame 210. The first groove 214 may have an elongated shape. For example, the first groove 214 may be formed to be elongated in the first direction intersecting the optical axis C. The second ball bearing 650 may be disposed in the first groove 214.

The second frame 220 may have a generally thin plate shape that is open in the vertical direction. The second frame 220 may be disposed on the first frame 210, and may be configured to move in the first direction intersecting the optical axis C. For example, the second frame 220 may be enabled to move in the first direction intersecting the optical axis C by the second ball bearing 650 being disposed between the first frame 210 and the second frame 220. Driving force required for driving the second frame 220 may be provided by the second driving assembly 400-4. The second groove 224 and the third groove 226 may be formed in the second frame 220. The second groove 224 may be formed in the lower portion of the second frame 220, and the third groove 226 may be formed in the upper portion of the second frame 220. The second groove 224 may be formed to be elongated in the first direction intersecting the optical axis C. The second groove 224 may form the space for accommodating the second ball bearing 650, together with the first groove 214. The third groove 226 may be formed to be elongated in the second direction intersecting the optical axis C and the first direction intersecting the optical axis C.

The third frame 230 may be formed to be open in the vertical direction and to have a predetermined height. The third frame 230 may be disposed on the second frame 220, and may be configured to move in the second direction intersecting the optical axis C. For example, the third frame 230 may be enabled to move in the second direction intersecting the optical axis C by the third ball bearing 660 being disposed between the second frame 220 and the third frame 230. Driving force required for driving the third frame 230 may be provided by the second driving assembly 400-4. The fourth groove 234 may be formed in the lower portion of the third frame 230. The fourth groove 234 may be formed to be elongated in the second direction intersecting the optical axis C. The fourth groove 234 may form the space for accommodating the third ball bearing 660, together with the third groove 226.

The lens barrel 160 may be combined with the third frame 230. The lens barrel 160 may be moved by the lens module 200 in the direction of the optical axis C and in a direction intersecting the optical axis C. For example, the lens barrel 160 may be moved in the direction of the optical axis C by the first frame 210. As another example, the lens barrel 160 may be moved in the first and second directions intersecting the optical axis C by the second frame 220 and the third frame 230. Movement of the lens barrel 160 in the direction of the optical axis C may enable focus adjustment of the camera module 10-2, and movement of the lens barrel 160 in a direction intersecting the optical axis C may perform an optical image stabilization (OIS) function of the camera module 10-2.

The first driving assembly 300 may be configured to move the lens module 200 in the direction of the optical axis C. For example, the first driving assembly 300 may provide driving force required to move the first frame 210 in the direction of the optical axis C. The first driving assembly 300 may include the first driving coil 310 and the first driving magnet 320. The first driving coil 310 may be disposed on the first surface of the housing 100, and the first driving magnet 320 may be disposed on the first surface of the first frame 210. The first surface of the housing 100 and the first surface of the first frame 210 may be arranged to oppose each other.

The second driving assemblies 400-4 and 500-4 may be configured to move the lens module 200 in the first and second directions intersecting the optical axis C. For example, the second driving assemblies 400-4 and 500-4 may provide driving force required for movement of the second frame 220 and the third frame 230. The second driving assembly 400-4 may include second driving coils 412 and 414, and a second driving magnet 420-4. The second driving assembly 500-4 may include second driving coils 512 and 514, and a second driving magnet 520-4. The second driving coils 412 and 414 may be arranged on the second surface of the housing 100, and the second driving coils 512 and 514 may be arranged on the third surface of the housing 100. The second driving magnet 420-4 may be arranged on the second surface of the third frame 230, and the second driving magnet 520-4 may be arranged on the third surface of the third frame 230. For reference, the second surface of the housing 100 may be a surface opposing the second surface of the third frame 230, and the third surface of the housing 100 may be a surface opposing the third surface of the third frame 230.

The camera module 10-2 may include components for supplying a current to the driving assemblies 300, 400-4, and 500-4. For example, the camera module 10-2 may include the substrate 120. The substrate 120 may be configured to supply a current required for driving the first driving assembly 300 and the second driving assemblies 400-4 and 500-4. For example, the substrate 120 may supply the current to the first driving coil 310 and the second driving coils 412, 412, 114, 512, and 514. The substrate 120 may be configured to provide the space in which the first driving coil 310 and the second driving coils 412, 412, 114, 512, and 514 are arranged. For example, the substrate 120 may be disposed to surround the first surface, the second surface, and the third surface of the housing 100, to provide the space in which the first driving coil 310 and the second driving coils 412, 412, 114, 512, and 514 are arranged in the housing 100. The yoke 140 may be disposed on one side of the substrate 120.

The camera module 10-2 may include a structure for binding the first frame 210 to the third frame 230. For example, the camera module 10-2 may include the cover member 700 for binding the second frame 220 and the third frame 230 to the first frame 210. The cover member 700 may be coupled to the first frame 210 in a state in which the first frame 210 to the third frame 230 are stacked, to prevent releases of the second frame 220 and the third frame 230 from the first frame 210. The buffer member 830 may be formed in the cover member 700. For example, a plurality of buffer members 830, protruding in an upward direction, may be formed in the upper portion of the cover member 700. The buffer member 830 may reduce impact due to collision between the lens module 200 and the shield can 900.

The camera module 10-2 may include a structure for shielding electromagnetic waves. For example, the camera module 10-2 may include the shield can 900. The shield can 900 may be formed to have a shape surrounding the housing 100, the lens module 200, and the cover member 700. Therefore, intrusion or emission of harmful electromagnetic waves generated outside or inside the camera module 10 may be blocked by the shield can 900.

The camera module 10-2 may include of the first position detecting sensor 610, the second position detecting sensor 620, and the third position detecting sensor 630. The first position detecting sensor 610 may detect a displacement in movement of the lens module 200 in the direction of the optical axis C, and the second position detecting sensor 620 and the third position detecting sensor 630 may detect a displacement in movement of the lens module 200 in a direction intersecting the optical axis C. The position detecting sensors 610, 620, and 630 may be hall sensors that detect a magnitude of magnetic field generated from the driving assemblies 300, 400-4, and 500-4, respectively. The position detecting sensors 610, 620, and 630 are not limited to hall sensors. The position detecting sensors 610, 620, and 630 may be respectively disposed in a space respectively surrounded by the driving coils 310, 412/414, and 512/514. For example, the first position detecting sensor 610 may be disposed inside the first driving coil 310, the second position detecting sensor 620 may be disposed inside of the second driving coil 412 or the second driving coil 414, and the third position detecting sensor 630 may be disposed inside of the second driving coil 512 or 514.

Structures of second driving assemblies 400-4 and 500-4 configured to minimize magnetic field interference will be described with reference to FIGS. 14A to 14C.

Figure 14A:
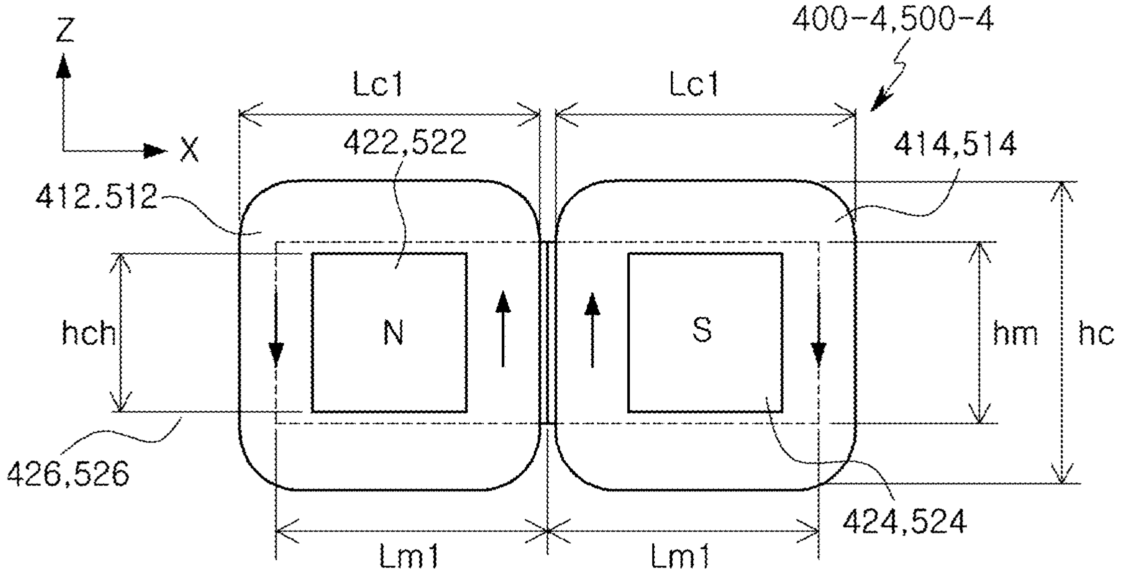
FIGS. 14A to 14C are configuration diagrams of driving assemblies illustrated in FIG. 13, according to an embodiment.
Figure 14B:
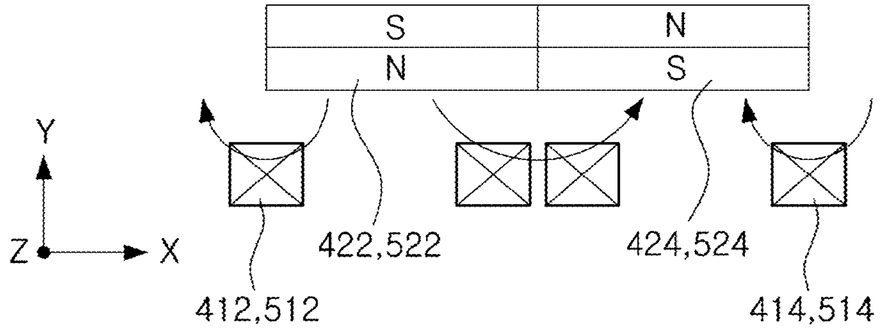
Figure 14C:
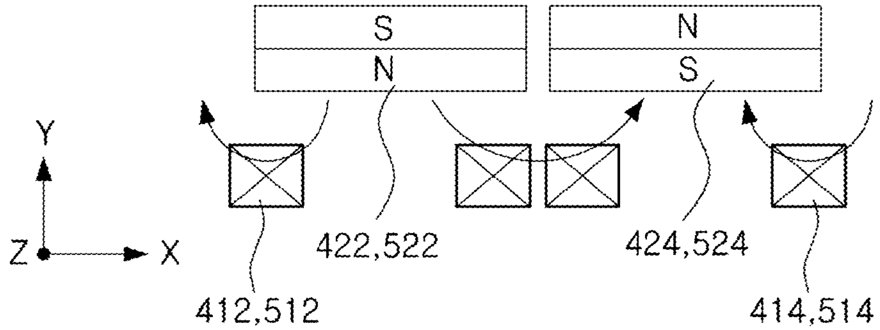

Referring to FIGS. 14A to 14C, the second driving assemblies 400-4 and 500-4 may include of the second driving coils 412, 414, 512, and 514, driving magnet members 422 and 424 constituting the second driving magnet 420-4, and driving magnet members 522 and 524 constituting the second driving magnet 520-4, such that the second driving coils 412, 414, 512, and 514 and the driving magnet members 422, 424, 522, and 524 are the same in number. The second driving coils 412 and 414 and the second driving coils 512 and 514 may be respectively arranged side-by-side in the first direction. The driving magnet members 422 and 424 and the driving magnet members 522 and 524 may be respectively arranged side-by-side in the first direction. For example, the second driving coils 412 and 512 may be arranged to oppose the driving magnet members 422 and 522, respectively, and the driving coils 414 and 514 may be arranged to oppose the driving magnet members 424 and 524, respectively.

The driving coils 412, 414, 512, and 514 may be generally configured to allow a current to flow along a boundary between and edges of the respective driving magnet members 422 and 522, 424, and 524. For example, the driving coils 412 and 512 may be arranged to flow a current along edges of the respective driving magnet members 422 and 522 and a boundary between the respective driving magnet members 422 and 522 and the respective driving magnet members 424 and 524, and the driving coils 414 and 514 may be arranged to flow a current along a boundary between the respective driving magnet members 422 and 522 and the respective driving magnet members 424 and 524 and along edges of the respective driving magnet members 424 and 524. The driving coils 412 and 512 may be arranged at intervals from the driving coils 414 and 514, respectively. For example, the driving coils 412 and 512 and the driving coils 414 and 514 may be arranged at intervals, based on the boundary between the respective driving magnet members 422 and 522 and the respective driving magnet members 424 and 524. The driving coils 412, 414, 512, and 514 may be configured to allow a current to flow in the same direction at the boundary between the respective driving magnet members 422 and 522 and the respective driving mag magnet members nets 424 and 524.

The driving coils 412, 414, 512, and 514 may have a predetermined size relationship with the driving magnet members 422, 424, 522, and 524, respectively. For example, a length Lc1 of each of the driving coils 412, 414, 512, and 514 in the first direction may be greater than a length (Lm1) of the driving magnet members 422, 424, 522, and 524, respectively, in the first direction. As another example, a height hc of an outer circumferential surface of each of the driving coils 412, 414, 512, and 514 may be greater than a height hm of the driving magnet members 422, 424, 522, and 524, respectively, and a height hch of an inner circumferential surface of each of the driving coils 412, 414, 512, and 514 may be less than a height hm of the driving magnet members 422, 424, 522, and 524, respectively.

A camera module according to embodiments disclosed herein may reduce magnetic field interference between driving assemblies of the camera module, and magnetic field interference between a driving assembly of the camera module and an electronic device disposed around the camera module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
- a lens barrel accommodating one or more lenses disposed in an optical axis direction;
- a first driving assembly configured to move the lens barrel in the optical axis direction; and
- a second driving assembly configured to move the lens barrel in a direction perpendicular to the optical axis direction,
- wherein the second driving assembly comprising,
  - a first driving magnet and a second driving magnet respectively fixed relative to the lens barrel;
  - a plurality of first driving coils facing the first driving magnet in a first direction; and
  - a second driving coil facing the second driving magnet in a second direction perpendicular to the first direction,
- wherein the plurality of first driving coils is disposed along the second direction, and
- wherein the first direction and the second direction are each perpendicular to the optical axis direction.

2. The camera module according to claim 1, wherein the plurality of first driving coils comprises:
- a 1-1 driving coil and a 1-2 driving coil respectively facing one surface of the first driving magnet,
- wherein the one side of the first driving magnet has different polarities on the side facing the 1-1 driving coil and the side facing the 1-2 driving coil.

3. The camera module according to claim 2, wherein the other side of the first driving magnet has a polarity opposite to the one side.

4. The camera module according to claim 2, wherein the second driving coil comprises:
- a 2-1 driving coil and a 2-2 driving coil arranged side by side in the first direction and each facing one surface of the second driving magnet.

5. The camera module according to claim 4, wherein the one side of the second driving magnet has different polarities on the side facing the 2-1 driving coil and the side facing the 2-2 driving coil, and
- wherein the other side of the second driving magnet has a polarity opposite to the one side.

6. The camera module according to claim 1, wherein the first driving magnet comprises:

a first magnetizing portion formed on a surface facing the plurality of first driving coils; and a second magnetizing portion formed on a side opposite to the first magnetizing portion;

wherein the first magnetizing portion has different polarities based on a polarity boundary line parallel to the optical axis direction.

7. The camera module according to claim 6, wherein the second magnetizing portion has a polarity opposite to that of the first magnetizing portion, and wherein the first magnetizing portion and the second magnetizing portion are formed integrally.

8. The camera module according to claim 1, wherein the first driving assembly comprises:

a third driving magnet fixed relative to the lens barrel; and a third driving coil facing the third driving magnet in a direction perpendicular to the optical axis direction.

9. The camera module according to claim 8, further comprises:

a housing accommodating the lens barrel;

a first frame movable in the optical axis direction with respect to the housing;

a second frame movable in the first direction with respect to the first frame; and a third frame that is movable in the second direction with respect to the second frame and to which the lens barrel is coupled.

10. The camera module according to claim 9, wherein a plurality of ball members is disposed between the first frame and the second frame or between the second frame and the third frame.

11. The camera module according to claim 10, wherein at least one of the first frame, the second frame, and the third frame comprises a groove in which at least one of the plurality of ball members is accommodated.

12. The camera module according to claim 9, wherein the first driving magnet and the second driving magnet are disposed in the third frame.

13. The camera module according to claim 12, wherein the plurality of first driving coils and the second driving coil are fixed to the housing.

14. The camera module according to claim 13, wherein the plurality of first driving coils and the second driving coil are disposed on a substrate surrounding at least one side of the housing.

15. The camera module according to claim 9, wherein the third driving magnet is disposed in the first frame, and wherein the third driving coil is fixed to the housing.

* * * * *